US012775451B2

(12) United States Patent
Szabo et al.

(10) Patent No.: US 12,775,451 B2
(45) Date of Patent: Oct. 27, 2026

(54) MODIFYING SOURCE CODE USING GENERATIVE MODELS

(71) Applicant: GOOGLE LLC, Mountain View, CA (US)

(72) Inventors: Jacint Szabo, Zurich (CH); Vojta Letal, Zurich (CH); Krzysztof Gorgolewski, New York, NY (US); Yi-Xuan Tan, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 173 days.

(21) Appl. No.: 18/586,101

(22) Filed: Feb. 23, 2024

(65) Prior Publication Data

US 2025/0272061 A1 Aug. 28, 2025

(51) Int. Cl.
*G06F 8/33* (2018.01)

(52) U.S. Cl.
CPC .................................... *G06F 8/33* (2013.01)

(58) Field of Classification Search
CPC ........................................................ G06F 8/33
USPC ........................................................ 717/106
See application file for complete search history.

(56) References Cited

U.S. PATENT DOCUMENTS

| | | | | |
|---|---|---|---|---|
| 10,437,588 | B1 * | 10/2019 | Crawford | G06F 8/73 |
| 11,960,867 | B1 * | 4/2024 | Singh | G06F 40/40 |
| 12,153,874 | B1 * | 11/2024 | Potash | G06F 40/44 |
| 12,346,690 | B2 * | 7/2025 | Qiao | G06F 8/73 |
| 12,481,484 | B2 * | 11/2025 | Schaefer | G06F 8/36 |
| 2023/0325182 | A1 * | 10/2023 | Farivar | G06F 8/73<br>717/123 |
| 2024/0303415 | A1 * | 9/2024 | Wilde | G06F 40/56 |

OTHER PUBLICATIONS

Foss, Jonathan GK, and Alexandra I. Cristea. "The next generation Authoring Adaptive Hypermedia: Using and Evaluating the MOT3.0 and PEAL tools." Proceedings of the 21st ACM conference on Hypertext and hypermedia. 2010. pp. 83-92. (Year: 2010).*
Kaiiali, Mustafa, et al. "Designing a secure exam management system (SEMS) for M-learning environments." IEEE Transactions on Learning Technologies 9.3 (2016): pp. 258-271. (Year: 2016).*

(Continued)

*Primary Examiner* — Satish Rampuria
(74) *Attorney, Agent, or Firm* — Gray Ice Higdon

(57) ABSTRACT

Implementations are described herein for using GMs such as LLMs to generate and/or modify source code. In various implementations, a modification made to either a source code comment or a snippet of source code that is referenced by the source code comment may be detected in first rendered GM output. A first GM prompt may be assembled to include data indicative of the modification and the source code comment and/or the snippet of the source code that is referenced by the source code comment. The first GM prompt may be processed using GM(s) to generate a first GM response, which may be operable to provide second rendered GM output that includes a new version of the source code in which the modification to the one of either the source code comment or the snippet is reflected in the other of the source code comment or the snippet.

20 Claims, 13 Drawing Sheets

(56) References Cited

OTHER PUBLICATIONS

Vezhnevets, Alexander Sasha, et al. "Generative agent-based modeling with actions grounded in physical, social, or digital space using Concordia." arXiv preprint arXiv:2312.03664 (2023). pp. 1-32. (Year: 2023).*

Matthews, Jacob, and Robert Bruce Findler. "Operational semantics for multi-language programs." ACM SIGPLAN Notices 42.1 (2007): pp. 3-10. (Year: 2007).*

Ko, Hyung-Kwon, et al. "Large-scale text-to-image generation models for visual artists' creative works." Proceedings of the 28th international conference on intelligent user interfaces. 2023. pp. 919-933. (Year: 2023).*

Abdelhamid, Riadh Ben, Yoshiki Yamaguchi, and Taisuke Boku. "A highly-efficient and tightly-connected many-core overlay architecture." IEEE Access 9 (2021): pp. 65277-65292. (Year: 2021).*

European Patent Office; International Search Report and Written Opinion issued in Application No. PCT/US2025/015249; 20 pages; dated Jul. 25, 2025.

YouTube; Codergrammer: "JetBrain AI Assistant :: In Depth"; retrieved from the internet: URL:https://www.youtube.com/watch?v=F0Ywaoml6zQ&t=4s; 28 pages; dated Dec. 27, 2023.

Anonymous; Sorrentino, B.; "Enhance your CLI with AI (Part 1)"; DEV Community; retrieved from the internet: URL:https://https://dev.to/bsorrentino/enhance-your-cli-with-ai-part-1-1ca; 8 pages; dated Oct. 3, 2023.

European Patent Office; Invitation to Pay Additional Fees issued in Application No. PCT/US2025/015249; 12 pages; dated Jun. 4, 2025.

* cited by examiner

MODIFYING SOURCE CODE USING GENERATIVE MODELS

A generative model (GM) such as a large language model (LLM) can be used to process, as generative model input, sequences of input tokens to generate, as generative model output, sequences of output tokens. These sequences of input/output tokens often take the form of strings of text, although they can take other forms such as embeddings, numbers, images, videos, audio, etc. One popular use for generative models is to automatically generate source code, with little or no human intervention. Source code generated in this manner will be referred to as "synthetic source code."

SUMMARY

If a user is dissatisfied with synthetic source code, they can copy the generative model output into a text editor and then modify the synthetic source code manually. Alternatively, the user may issue a follow up natural language request to modify the entirety of the synthetic source code, e.g., to implement a different algorithm, replace tokens with other tokens (e.g., variable names), etc. However, it may be the case that the user is satisfied with some parts of the synthetic source code but not with others.

Implementations are described herein for using GMs such as LLMs to generate and/or modify source code, both synthetic and/or human composed. More particularly, but not exclusively, implementations are described herein for determining which subportion(s) of synthetic source have been selected by a user, and modifying those selected subportion(s) and other subportions of the synthetic source code that are related to the selected subportions based on a request from the user. A user may select a subportion of synthetic source code generated using a generative model such as a GM in various ways, such as highlighting content (text and/or images) using a pointer device, touchscreen, and/or keyboard, verbally identifying a particular portion (e.g., "change the second function to be recursive," "replace variable 'foo' with variable 'bar'"), and so forth. In some implementations, the synthetic source code may also be provided within an editable text field or other similar interface. This may allow the user to edit the synthetic source code directly, instead of requiring the user to copy and paste the synthetic source code into a source code editor such as an integrated development environment (IDE), or other application that allows the user to edit synthetic source code.

Techniques described herein give rise to various technical advantages. A user who wishes to modify one part (e.g., a statement, comment, condition, function) of synthetic source code but to leave another part of the synthetic source code untouched is no longer required to copy the entire synthetic source code into a separate source code editing application. Instead, the user can provide the specific subportion of the synthetic source code they wish to edit as input to a generative model (e.g., LLM), along with their modification request. A subsequent generative model prompt that includes the user's modification request and selected subportion of the synthetic source code will be shorter than a subsequent generative model prompt that includes the entire synthetic source code and the user's modification request. Consequently, less computational resources (e.g., processor cycles, memory) may be consumed, especially considering that generative models often have hundreds of billions of parameters, which means longer input sequences take longer to process.

In some implementations, a method may be implemented by one or more processors and may include: detecting, in first rendered generative model (GM) output comprising an instance of source code generated using one or more GMs, a modification made to one of either a source code comment or a snippet of the source code that is referenced by the source code comment; assembling a first GM prompt to include data indicative of the modification and one or both of the source code comment and the snippet of the source code that is referenced by the source code comment; processing the first GM prompt using one or more of the GMs to generate a first GM response; providing the first GM response to a client application, wherein the first GM response is operable by the client application to provide second rendered GM output, and wherein the second rendered GM output comprises a new version of the source code in which the modification to the one of either the source code comment or the snippet is reflected in the other of the source code comment or the snippet.

In various implementations, the modification may be made to the source code comment, and the snippet of the source code that is referenced by the source code comment may be altered syntactically or functionally to reflect the modification made to the source code comment. In various implementations, at least one instance of the snippet of the source code may be contained in the first rendered GM output. In various other implementations, at least one instance of the snippet of the source code may be contained outside of the first rendered GM output. In various implementations, the at least one instance of the snippet that is contained outside of the first rendered GM output may be contained in another instance of source code that was generated using one or more of the GMs.

In various implementations, the instance of source code may include one source code file of a plurality of source code files generated using one or more of the GMs. In various implementations, the modification may be made to the snippet of source code referenced by the source code comment, and the source code comment may be altered semantically to reflect the modification made to the snippet of the source code.

In various implementations, the method may include: receiving an indication of a subportion of the first rendered GM output that has been selected using one or more input devices, and a request for a modified version of the selected subportion of the first rendered GM output; extracting, from a previous GM response that was operated by the client application to provide the first rendered GM output, a subportion of the previous GM response that corresponds to the selected subportion of the first rendered GM output; and assembling, into the first GM prompt, the selected subportion of the first GM response with data indicative of a request to modify the selected subportion of the first rendered GM output.

In various implementations, the request may be a natural language request that is spoken and transcribed or typed. In various implementations, the request may be a command received via a rendered selectable element of a graphical user interface. In various implementations, the rendered selectable element may include an enumerate list of candidate modifications. In various implementations, the enumerated list of candidate modifications may be a context specific list of candidate modifications that are selected based on the selected subportion of the first rendered GM output.

In various implementations, the method may further include: processing a second GM prompt using one or more of the GMs to generate a third GM response; and providing the third GM response to the client application, wherein the third GM response is operable by the client application to provide third rendered GM output, and wherein the third rendered GM output comprises a plurality of graphical elements representing a plurality of source code files generated using one or more of the GMs. In various implementations, the plurality of graphical elements may be arranged in a hierarchy that is based on dependencies between the plurality of source code files. In various implementations, the method may include: receiving an indication that one or more graphical elements of the plurality of graphical elements have been selected using one or more of the input devices, and a request for a modification to one or more of the source code files represented by the one or more selected graphical elements; assembling third GM prompt that includes: data indicative of the request for the modification to one or more of the source code files represented by the one or more selected graphical elements, and data indicative of the one or more source code files represented by the one or more selected graphical elements; processing the third GM prompt using one or more of the GMs to generate a fourth GM response; and providing the fourth GM response to the client application, wherein the fourth GM response is operable by the client application to provide fourth rendered GM output that reflects the modification to one or more source of the code files.

In various implementations, the fourth GM output may include an updated plurality of graphical elements arranged in an updated hierarchy that reflects the modification to one or more source of the code files. In various implementations, the request for the modification to one or more of the source code files may include a request to merge two or more of the source code files. In various implementations, the request for the modification to one or more of the source code files may include a request to alter a dependency between two or more of the source code files.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
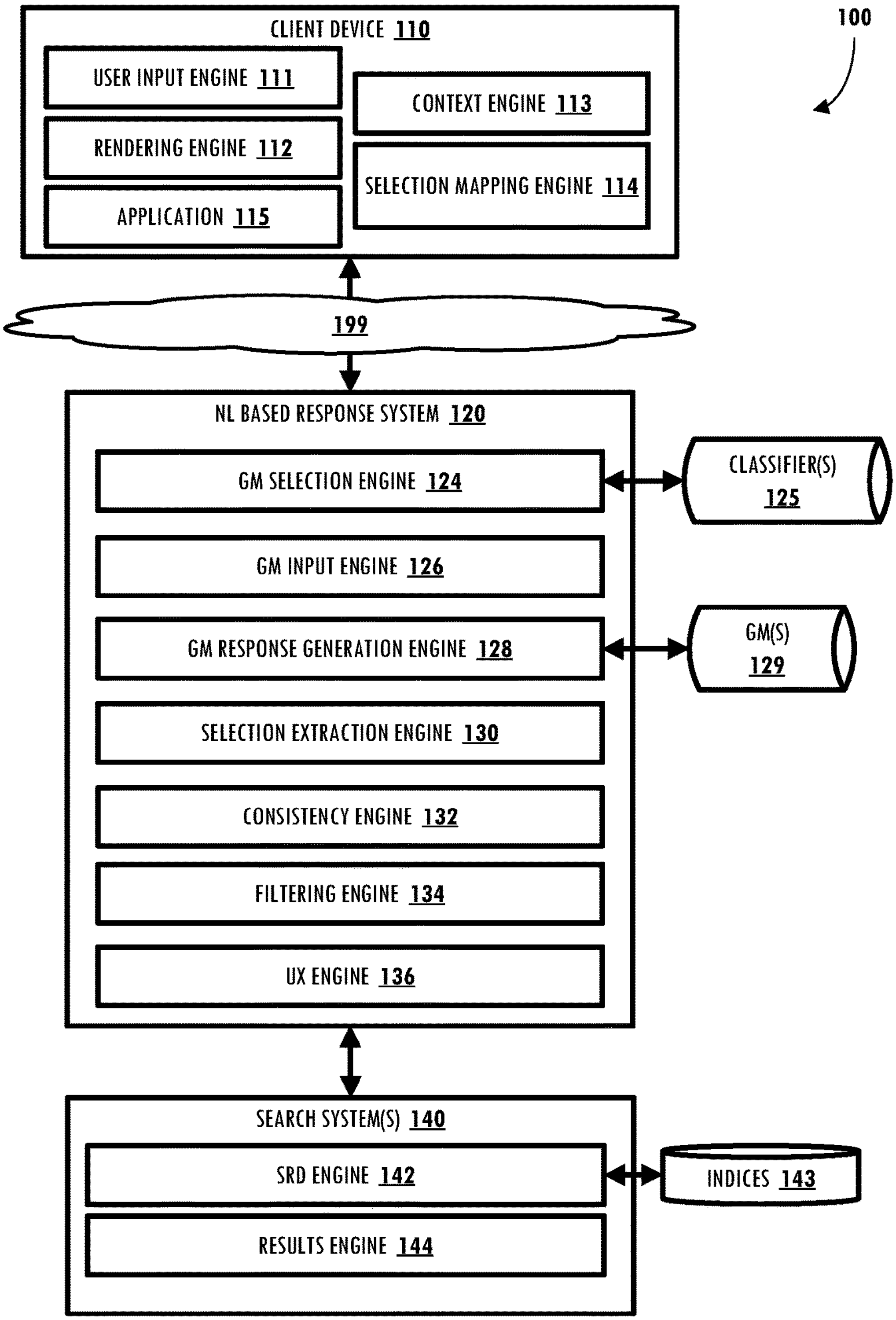
FIG. 1 depicts a block diagram of an example environment that demonstrates various aspects of the present disclosure, and in which some implementations disclosed herein can be implemented.

Implementations are described herein for using generative models (GMs) such as large language models (LLMs) to generate and/or modify source code, whether the source code be synthetic, or human composed. More particularly, but not exclusively, implementations are described herein for determining which subportion(s) of synthetic source have been selected by a user, and modifying those selected subportion(s) and other subportions of the synthetic source code that are related to the selected subportions based on a request from the user. A user may select a subportion of synthetic source code generated using a generative model such as an LLM in various ways, such as highlighting content (text and/or images) using a pointer device, touchscreen, and/or keyboard, verbally identifying a particular portion (e.g., "change the second function to be recursive," "replace variable 'foo' with variable 'bar'"), and so forth. In some implementations, the synthetic source code may also be provided within an editable text field or other similar interface. This may allow the user to edit the synthetic source code directly, instead of requiring the user to copy and paste the synthetic source code into a source code editor such as an integrated development environment (IDE), or other application that allows the user to edit synthetic source code.

In various implementations, when a user issues a natural language query, that query may be used to assemble a generative model prompt that is then processed using a generative model such as an LLM to generate a generative model response. In various implementations, the generative model response may include a sequence of tokens that includes and/or represents (e.g., can be used to derive) raw or plain text, such as source code. The generative model response may be operable to cause a client application, such as an application that gives access to an automated assistant or chatbot that engages in human-to-computer dialogs using the generative as a backend, or an IDE that incorporates selected aspects of the present disclosure, to render the generative model response as a rendered generative model output that includes synthetic source code.

As used herein, "rendered generative model output" and "rendered GM output" (or simply "rendered output") will refer to what is presented to the user. The user may select subportion(s) of rendered output(s), issue request(s) to modify those selection(s), and be presented modified rendered output(s) in which the selected subportion(s) are altered based on the user's request(s). "Generative model responses," "GM responses," or "raw GM responses" will refer to the sequence of tokens that are directly generated using the generative model. These tokens may include, for example, sequences of text that contain instructions, comments, and any other data that forms synthetic source code.

In various implementations, the user may be able to select a subportion (i.e. less than all) of the synthetic source code contained in the rendered generative model output and manipulate just that selected subportion by issuing a follow up request to the generative model. For instance, if the synthetic source code contains three functions, the user may be able to select the middle function and issue a variety of different types of requests to manipulate only the selected subportion, while leaving the remainder of the synthetic source code unaltered.

In some implementations, these follow-up requests may be provided as an enumerated list of candidate modifications. In some such implementations, the enumerated list of candidate modifications may be a context specific list of candidate modifications that are selected based on the selected subportion of the first rendered GM output. For instance, if a source code function or source code instructions are highlighted, then the list may include options such as "refactor," "correct syntax errors," "add comment," "replace variables with pointers," "rename variable(s)," "suggest alternative algorithm," etc. If a source code comment is selected, the list of options may include, for instance, "describe algorithm," "correct grammar," etc. If graphical element(s) representing entire source code file(s) are selected, then the list may include options such as "merge," "refactor," "translate (to a different programming language)," etc. In some implementations, to generate the options for the enumerated list, the selected subportion of the GM rendered output may be processed, e.g., by GM response generation engine 128, along with a request to generate the enumerated list (e.g., "write a list of actions that can be taken to improve or otherwise modify this code").

In some implementations, notwithstanding a user's selecting a particular subportion of source code and requesting that it be modified, elements of the source code outside of the selection may also be modified. As one example, suppose the user selects one or more instructions and/or a function, and requests that a particular variable be renamed. That same variable may, with or without the user being aware, be used elsewhere in the synthetic source code, e.g., in the same source code file, or in a different source code file. Failing to change the variable name globally may cause errors in compilation and/or execution. Accordingly, in some implementations, if a user makes a change to a particular selected subportion of synthetic source code, and that change may be propagated to other areas of source code that are not selected by the user.

In some implementations, an indication of the subportion of the synthetic source code that was selected by the user (e.g., starting and ending character positions) may be used to extract a portion of the original generative model response. This extracted portion may then be assembled into a follow up generative model prompt along with the user's follow up request. In some implementations, additional implied request(s) or command(s) may also be incorporated into the follow up generative model prompt that are designed to trigger selected aspects of the present disclosure.

In some implementations, generative models such as LLMs may be trained and/or fine-tuned to process commands to account for discrepancies between details contained inside and outside of a user's selection. For example, an explicit user follow up request to rename a variable from "variableA" to "variableB" in a selected portion of rendered output may trigger generation of an implied request to also rename the variable elsewhere in the whole of the synthetic source code, even in portion(s) not selected by the user. For instance, a user may select a particular code segment (e.g., a line or block) of synthetic source code and request that a variable name contained in the selection be altered. The same variable name may then be altered throughout the synthetic source code, both in the user's selection and elsewhere. In some such implementations, instances of the variable-to-be-altered that are found outside of the user's selection may be presented to the user one at a time, as a list, etc., so that the user can toggle through and approve (or reject) each proposed replacement.

In some implementations, the generative model may be trained and/or fine-tuned to ensure that snippets of source code and comments that reference them remain consistent. For example, suppose a user selects a snippet of source code and requests that a first algorithm currently implemented by the selected snippet of source code be replaced by a second algorithm (e.g., one type of sort to replace another type of sort, one type of machine learning model to be replaced by another, etc.). A comment that accompanies the original source code snippet may reference the first algorithm-failing to update the comment may introduce confusion to other users who view the synthetic source code subsequently. Accordingly, in various implementations, the generative model may be trained to process both source code snippets and comments that reference those source code snippets to ensure the two are consistent with each other. Notably, this may occur in both directions. If the user selects and modifies a source code snippet, the generative model may be used to generate an updated comment that accurately reflects the new state of the source code snippet. Likewise, if the user selects and modifies a source code comment, the generative model may be used to generate an updated source code snippet that accurately reflects the change to the source code comment.

Techniques described herein are not limited to modifying source code statements and/or comments directly. In various implementations, techniques described herein may be used to modify graphical elements that represent synthetic and/or human-composed source code files as a whole. For example, a user may submit a natural language request such as "write a source code project that manages my existing inventory of products" to a generative model such as an LLM. The generative model may be used to generate multiple different source code files (e.g., configuration files, header files, implementation files, module files, script files, etc.) that are related to each other in various ways, and that more accurately represent modern coding techniques and principles.

In addition to or instead of causing the content of the individual source code files to be rendered to the user, the generative model output may be operable to render graphical elements, each representing a respective source code file as a whole. In some implementations, these graphical elements may be arranged in a hierarchy that is selected or dictated based on factors such as source code dependencies, standard practices for writing and organizing software, etc. In various implementations, a user may be able to select one or more of the graphical elements and issue various types of requests. If two or more graphical elements are selected, the user may request changes that affect all of the source code files that underly the multiple selected graphical elements. For instance, a user could request that two or more source code files be merged, moved to a different location in a source code or file storage hierarchy, etc. If a single graphical element is selected, the user may issue a request (e.g., change "variableA" to "variableB") that only affects the source code file underlying the selected graphical element, or may issue a request (e.g., "merge his file with its parent") that affects other source code files as well.

Turning now to FIG. 1, a block diagram of an example environment 100 that demonstrates various aspects of the present disclosure, and in which implementations disclosed herein can be implemented is depicted. The example environment 100 includes a client device 110, a natural language (NL) based response system 120, and search system(s) 140. Although illustrated separately, in some implementations all or aspects of NL based response system 120 and all or aspects of search system(s) 140 can be implemented as part of a cohesive system.

In some implementations, all or aspects of the NL based response system 120 can be implemented locally at the client device 110. In additional or alternative implementations, all or aspects of the NL based response system 120 can be implemented remotely from the client device 110 as depicted in FIG. 1 (e.g., at remote server(s)). In those implementations, the client device 110 and the NL based response system 120 can be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more applications, such as application 115, via which queries can be submitted and/or NL based summaries and/or other response (s) to the query can be rendered (e.g., audibly and/or visually). The application 115 can be an application that is separate from an operating system of the client device 110 (e.g., one installed "on top" of the operating system)—or can alternatively be implemented directly by the operating system of the client device 110. For example, the application 115 can be a web browser installed on top of the operating system, or can be an application that is integrated as part of the operating system functionality. The application 115 can interact with the NL based response system 120. In some implementations, the application 115 may be a source code editing application such as an integrated development environment (IDE).

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110. Some instances of a query or request described herein can be a query or request that is formulated based on user input provided by a user of the client device 110 and detected via user input engine 111. For example, the query or request can be a typed query or request that is typed via a physical or virtual keyboard, a suggested query or request that is selected via a touch screen or a mouse, a spoken voice query or request that is detected via microphone(s) of the client device, or an image query or request that is based on an image captured by a vision component of the client device.

In various implementations, the client device 110 can include a rendering engine 112 that is configured to provide content (e.g., synthetic source code, etc.) for audible and/or visual presentation to a user of the client device 110 using one or more user interface output devices. For example, the client device 110 can be equipped with one or more speakers that enable content to be provided for audible presentation to the user via the client device 110. Additionally, or alternatively, the client device 110 can be equipped with a display or projector that enables content to be provided for visual presentation to the user via the client device 110. In some implementations, the display may be part of a head-mounted display (HMD).

In some implementations, rendering engine 112 may be configured to generate rendered content based on raw generative model responses. For example, a GM response may include a sequence of tokens that is operable by rendering engine 112 to render audible and/or visual output. In some implementations, this sequence of tokens may include a sequence of raw text. Some parts of the sequence of raw text may include meaningful content that is responsive to a user's query or request. Other parts of the sequence of text may include metadata instructions (e.g., symbols) that are usable, e.g., by rendering engine 112 (or by UX engine 136, described below), to cause the meaningful content to be rendered in a particular way (e.g., with selected fonts, line breaks, images, formatting, etc.). In some implementations, rendering engine 112 may also be configured to create a mapping between raw generative model responses and the downstream rendered content that is generated based on the raw generative model responses. For instance, when incorporating raw GM content into HTML DOM nodes, rendering engine 112 may add attributes (e.g., character offsets) to HTML tags that identify where in the underlying raw GM response the content that is going to be displayed using the DOM node is located.

In various implementations, the client device 110 can include a context engine 113 that is configured to determine a context (e.g., current or recent context) of the client device 110 and/or of a user of the client device 110. In a multi-turn dialog session between the user and an automated assistant (alternatively, "virtual assistant", "chatbot", etc.), the context of the client device and/or user may be maintained over multiple turns as a "user state."

In some implementations, the context engine 113 can determine a context and/or update the user's state utilizing current or recent interaction(s) via the client device 110 (e.g., source code and/or source code comments currently highlighted by the user, or graphical elements representing source code files that are currently selected), a location of the client device 110, profile data of a profile of a user of the client device 110 (e.g., an active user when multiple profiles are associated with the client device 110), and/or other data accessible to the context engine 113. For example, the context engine 113 can determine a current context based on a one or more recent queries of the search session, profile data, and/or a current location of the client device 110. For instance, the context engine 113 can determine a current context of "looking for a healthy lunch restaurant in Louisville, Kentucky" based on a recently issued query or request, profile data, and a location of the client device 110.

As another example, the context engine 113 can determine a current context based on which application is active in the foreground of the client device 110, a current or recent state of the active application, content currently or recently rendered by the active application, and/or content recently or currently selected (e.g., highlighted) by a user. A context determined by the context engine 113 can be utilized, for example, in supplementing or rewriting a query or request that is formulated based on user input, in generating an implied query or request (e.g., a query or request formulated independent of user input), and/or in determining to submit an implied query/request and/or to render result(s) for an implied query/request.

In various implementations, client device 110 can include a selection mapping engine 114 that is configured to map user-selected subportion(s) of rendered GM output provided by rendering engine 112 to corresponding subportion(s) of raw GM responses that were used to generate the rendered GM output. In some implementations, selection mapping engine 114 may utilize the HTML attributes (e.g., character offsets) mentioned previously to map user-selected subportion(s) of rendered GM output provided by rendering engine 112 to corresponding subportion(s) of raw GM responses. In other implementations in which graphical elements representing a source code hierarchy are rendered, selection mapping engine 114 may map each graphical element to a beginning point of the corresponding source code file.

In various implementations, selection mapping engine 114 may provide data indicative of this mapping, such as starting and ending characters indexes in the raw generative model response, to other components to extract the corresponding portion of the raw generative model response. In some cases, selection mapping engine 114 may provide data indicative of the mapping to a component of NL based response system 120, such as selection extraction engine 130, and selection extraction engine 130 may extract the corresponding portion(s) of the raw GM response (e.g., source code files corresponding to selected graphical elements of a rendered source code hierarchy). In other cases, selection mapping engine 114 may use the mapping data directly to extract the corresponding portion of the raw generative model response, and provide that extracted portion to a component of NL based response system 120, such as generative model input engine 126 (discussed in more detail below).

Further, the client device 110, the NL based response system 120, and/or the search system 140 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form a coordinated ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

NL based response system 120 is illustrated as including a GM selection engine 124, a GM input engine 126, a GM response generation engine 128, a selection extraction engine 130, a consistency engine 132, a filtering engine 134, and a user interface (UX) engine 136. Some of the engines can be omitted and/or combined in various implementations.

The GM selection engine 124 can, for example, select zero or more GMs from multiple candidate GMs. For example, in some iterations the system will determine to not utilize any of the candidate GMs, in some iterations the system will determine to utilize only one of the candidate GMs, and in some iterations the system will determine to utilize multiple of the candidate GMs. GM selection engine 124 can optionally utilize one or more rules and/or one or more classifiers 125 that are trained to generate output identifying which GM(s) are best suited to generate a response to a current query or request, given a current user state/context.

The GM input engine 126 may be configured to assemble GM input prompts based on data such as a current query, current user state/context, past queries, past GM responses (which may be included in the current user state/context), portions of past rendered GM outputs that are selected by users for modification, portions of source code (synthetic or human-composed) that are adjacent, proximity, or otherwise related to selected portions of source code, etc. GM input prompts may, in some implementations, include a sequence of tokens, which may be words, phrases, or embeddings generated from data such as text (e.g., source code), images, audio, etc.

The GM response generation engine 128 may be configured to apply one or more GMs stored in a GM database 129 to GM input prompts generated by GM input engine 126 to generate a GM response. A GM response may take various forms, such as a sequence of tokens that correspond to, represent, or directly convey words, phrases, embeddings, etc. GMs stored in GM database 129 may take a variety of form, such as PaLM, BARD, BERT, LaMDA, Meena, GPT, and/or any other GM, such as any GM that is encoder-only based, decoder-only based, sequence-to-sequence based and that optionally includes an attention mechanism or other memory. Visual language models (VLMs) capable of processing images and text, and/or image diffusion models, may be included as well.

Selection extraction engine 130 may be configured to extract subportions of raw GM responses that correspond with selected subportions of rendered GM output provided at client device 110 by rendering engine 112 based on the raw GM responses. As noted previously, in some implementations, selection extraction engine 130 may extract these portions of raw GM responses based on mapping data received from selection mapping engine 114. For example, selection mapping engine 114 may provide starting and/or ending character positions, and selection extraction engine 130 may extract the subportion of the raw GM response that begins at the starting character position and ends at the ending character position.

Consistency engine 132 may be configured to evaluate the remainder of the raw GM response outside of the subportion (s) extracted by selection extraction engine 130 in order maintain consistency between various aspects of the selected and unselected portions of the rendered GM output. Suppose a user selects a particular source code instruction and says, "Please change the variable 'foo' to 'bar'." The selected instruction may be extracted by selection extraction engine 130 and incorporated into a subsequent GM input prompt by GM input engine 126. This subsequent GM input prompt may also include the user's request to change the variable name. When the subsequent input request is processed by GM response generation engine 128 using an GM 129, the resulting GM response may include the previous GM response, except with the variable name changed from "foo" to "bar." However, if the "foo" variable number were also included in another portion of the original synthetic source code that the user didn't select, that other instance of the variable "foo" not be replaced as requested, resulting in syntactic or logic error.

Accordingly, in various implementations, consistency engine 132 may be configured to ensure that details such as variable names changed within the selected portion of the original rendered GM output (e.g., synthetic source code) are also changed elsewhere, where applicable. In some implementations, consistency engine 132 may perform its actions heuristically, e.g., by extracting entities and facts from both the user selection and the remainder of the rendered GM output and comparing them. In other implementations, the GM 129 itself may be trained to maintain consistent syntactic elements (e.g., variable names) across both selected and unselected portions of synthetic source code.

As another example, consistency engine 132 may be configured to ensure consistency between source code snippets and comments that describe them. For instance, if a user selects a source code snippet (e.g., an instruction, entire code block, function, etc.) and requests a modification, consistency engine 132 may ensure that any comments describing the modified source code snippet are also altered to reflect the modification to the source code snippet. Likewise, if a user selects a source code comment and requests a modification, consistency engine 132 may ensure that the source code snippet(s) referenced by the source code comment are also altered to reflect the modification the change to the source code snippet.

In various implementations, consistency engine 132 may maintain consistency between source code comments and source code snippets in various ways. In some implementations, one or more GMs 129 may be pre-trained or fine-tuned using pairs of pre-modification and post-modification source code snippets/comments. Subsequently, GM input engine 126 and/or consistency engine 132 detects that a user is requesting modification of a source code snippet or comment, engine 126/136 may automatically detect the other of the source code snippet or comment, and provide both as inputs to GM response generation engine 128. GM response generation engine 128 may then predict both the post-modification source code snippet and source code comment based on the original source code snippet and comment, as well as data indicative of the user's request.

Updating selected subportions of source code using generative models such as LLMs can sometimes generate unpredictable results. If a user asks for more functionality to be added a given selection (e.g., a function), the user may not want the resulting replacement of that function generated using the GM 129 to be significantly longer or have require significantly more computational resources to execute. Accordingly, in some implementations, filtering engine 134 may be configured to ensure that a user's request to modify a selected subportion of source code does not result in potentially negative consequences (e.g., computationally or logically), too many changes, etc. For instance, in some implementations, filtering engine 134 may throw an error and/or cause a warning to be issued to the user if the user's request results in a threshold number of changes (e.g., altered characters or words), or changes that are too substantial (calculated, for instance, using edit distances, word counts, etc.).

In some implementations, UX engine 136 may be configured to provide client device 110 with raw GM responses (e.g., sequences of tokens intermixed with metadata instructions), which may be operable by rendering engine 112 to provide rendered GM output. Additionally or alternatively, in some implementations, UX engine 136 may generate content that can be rendered more directly, such as HTML code that includes the raw GM response and that can be rendered by rendering engine 112 or application 115, e.g., as a webpage, or synthetic source code.

Search system 140 is illustrated as including an SRD engine 142 and a results engine 144. Some of the engines can be omitted or combined with each other in various implementations. The SRD engine 142 can, for example, utilize indices 143 and/or other resources in identifying search result documents that are responsive to queries or requests as described herein. For example, SRD engine 142 can use queries or requests formulated by component(s) of NL based response system 120 to identify search result documents such as publicly available source code examples that can be used for modifying selected subportions of rendered GM output. For example, a user may request that alternative source code for accomplishing the same or similar semantic goal as a selected portion of synthetic source code be retrieved. The results engine 144 can provide non-LLM generated search results that can be harvested for source code alternatives to be presented, and/or that may be used by GM response generation engine 128 to generate modified GM responses.

Figure 2:
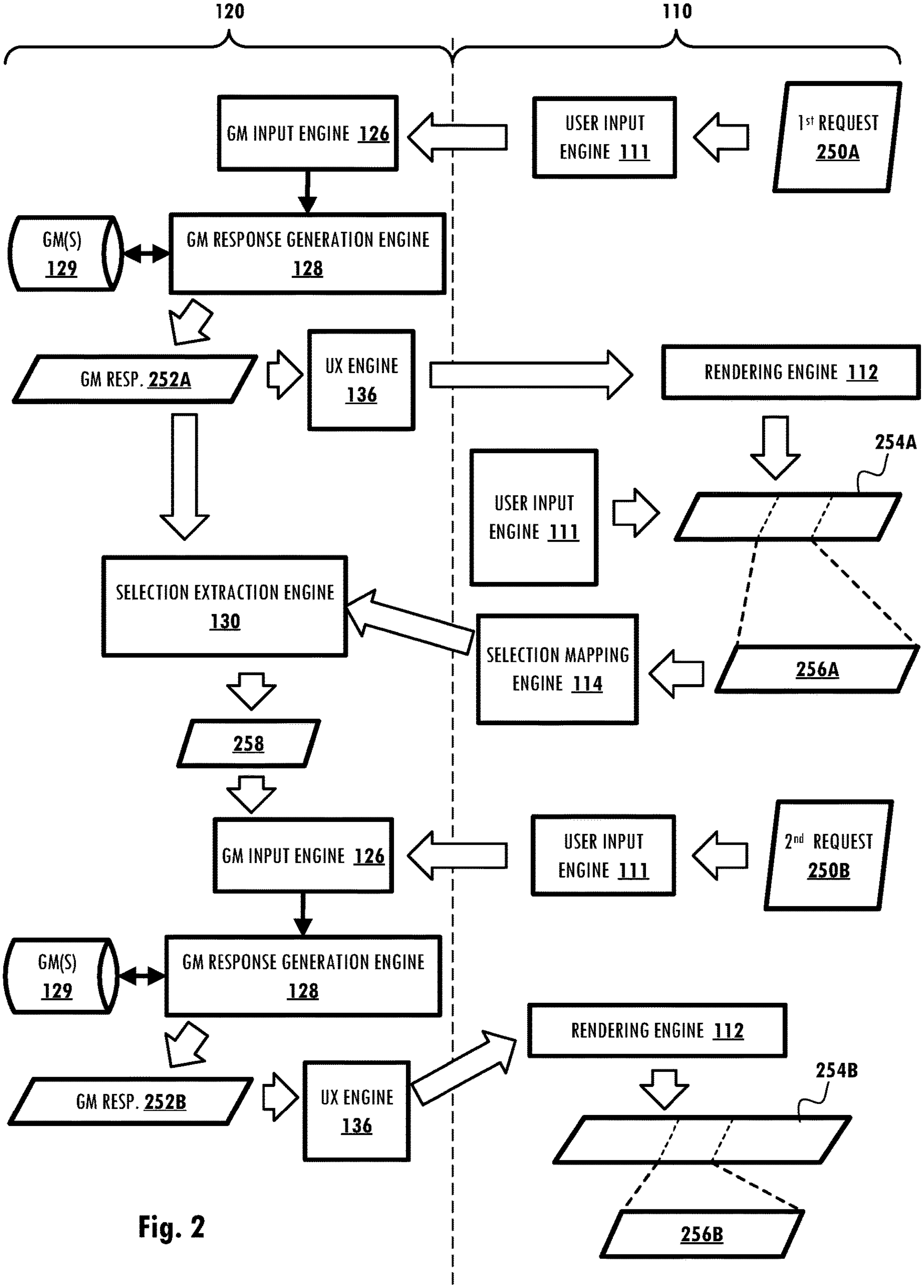
FIG. 2 schematically depicts an example of how various components described herein may cooperate to perform selected aspects of the present disclosure.

FIG. 2 schematically depicts an example of how various components depicted in FIG. 1 may cooperate to carry out selected aspects of the present disclosure. As indicated at top, in some implementations, the components on the left side of the vertical dashed line may be part of NL based response system 120. Components on the right side of the vertical dashed line may be part of client device 110. In other implementations, various components may be implemented elsewhere.

Starting at top right, a first request 250A may be received at user input engine 111. As a working example, assume the first request 250A is a request to generate synthetic source code. User input engine 111 may provide data indicative of the first request 250A (e.g., the request itself, embedding(s) generated therefrom, etc.) to GM input engine 126 of NL based response system 120. First request 250A may be typed, may be transcribed using ASR on a spoken utterance, or may even be an implied query. Whichever the case, data indicative of first request 250A may be assembled by GM input engine 126 into a GM prompt (not depicted) that is then processed by GM response generation engine 128 using one or more GMs from database 129 to generate a first raw GM response 252A. As noted previously, first raw GM response 252A may include a sequence of tokens, such as a sequence of raw text that includes both content responsive to the request and metadata instructions interspersed therein. First raw GM response 252A may be provided by UX engine 136 to rendering engine of client device 110. Rendering engine 112 may provide, e.g., a display, first rendered GM output 254A. In the working example, first rendered GM output 254A may include synthetic source code itself, or graphical elements that represent synthetic source code files. In some implementations, the graphical elements may be arranged in a hierarchy that reflects relationships between elements of the source code files and/or the source code files themselves.

Once rendered at client device 110, the user may select, e.g., via user input engine 111, a subportion 256A of the first rendered GM output 254A. In various implementations, the selected subportion 256A may be provided to selection mapping engine 114, which may in turn provide, to selection extraction engine 130 of NL based response system 120, data indicative of a mapping (e.g., starting and ending character positions) between the selected subportion 256A of the first rendered GM output 254A and a corresponding subportion of first raw GM response 252A. Selection extraction engine 130 may then use the mapping to extract a corresponding selected subportion 258 of the raw GM response 252A.

Meanwhile, a second request 250B may be received from the user at client device, e.g., at user input engine 111. Second request 250B may include one or more commands to modify, alter, remove, etc., the selected subportion 256A. For example, second request 250B may include a request to change one of a comment or corresponding source code snippet (which as explained herein may result in consistency engine 132 ensuring that the other of the comment and source code snippet remains consistent), a request to rename a variable, a request to merge or change dependencies between source code files, etc. Second request 250B and selected subportion 258 of the raw GM response 252A may be provided to GM input engine 126, e.g., for assembly into another GM input prompt. In some implementations, this additional GM input prompt may also include the first request 250A.

The additional GM input prompt may then be processed by GM response generation engine 128 using an GM 129 to generate a subsequent raw GM response 252B. Subsequent raw GM response 252B may then be provided by UX engine 136 to rendering engine 112 on client device 110. Rendering engine 112 may then generate and provide subsequent rendered GM output 254B. Subsequent rendered GM output 254B may include unaltered portions of the original synthetic source code that were not selected by the user, as well as a modified subportion 256B (modified source code snippet and/or comment) in place of the selected subportion 256A of original synthetic source code. In some implementations where consistency engine 132 is deployed, the portions of original rendered GM output 254A that are provided may also be modified if details contained therein, such as variable names, source code comments, etc., would otherwise be inconsistent or conflict with details in the modified subportion 256B of subsequent rendered GM output 254B.

Figure 3A:
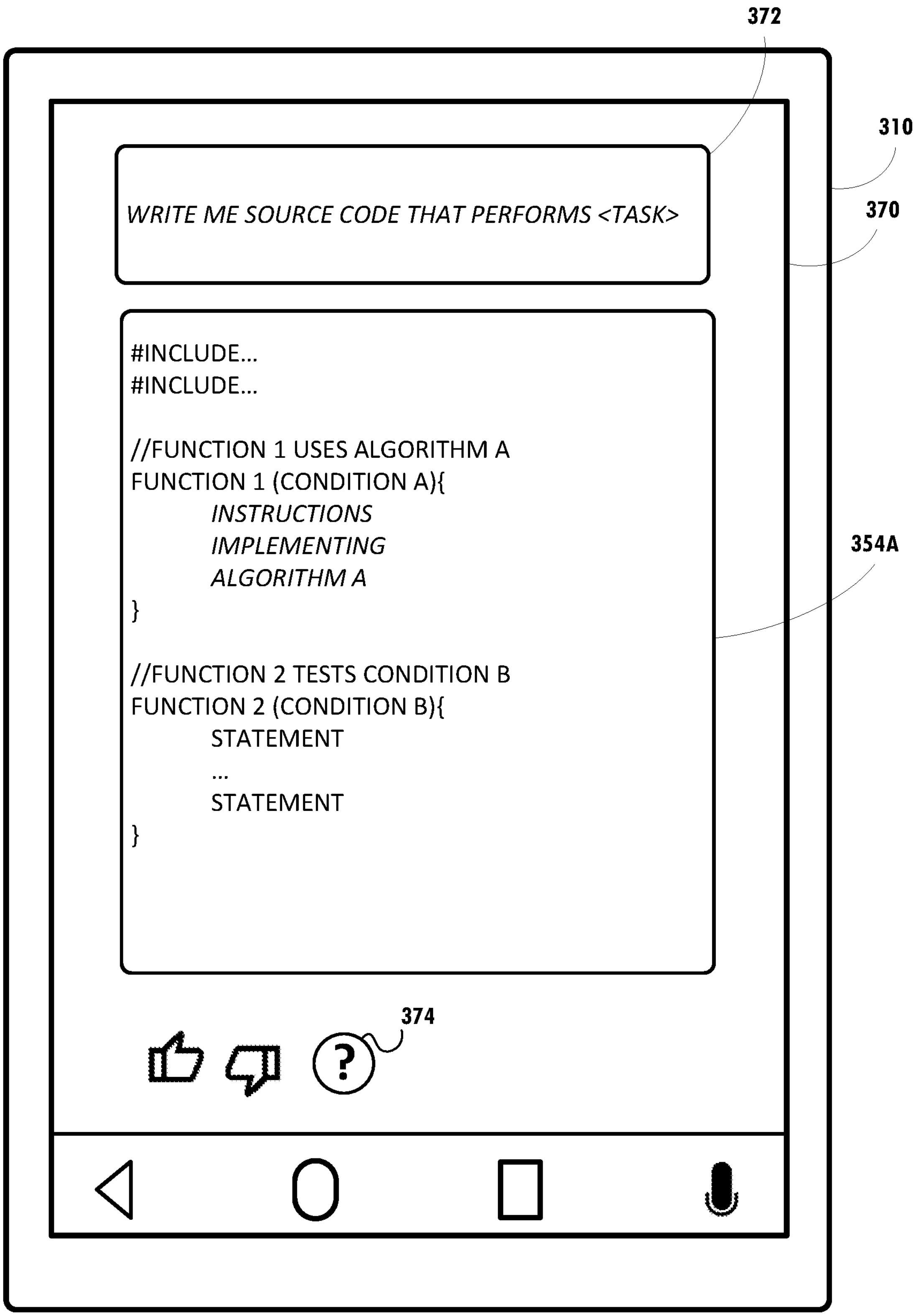
FIG. 3A, FIG. 3B, FIG. 3C, FIG. 3D, and FIG. 3E schematically depict examples of a graphical user interface (GUI) being used in accordance with various implementations described herein.

FIG. 3A depicts an example client device 310 in the form of a tablet computer that is being used to engage with NL based response system 120. Client device 310 includes a display 370 on which a query input field 372 is rendered. A user (not depicted) has entered, into query input field 372 (by typing or having a spoken utterance speech recognized), the request, "write me source code that performs <task>)" (where <task> can be any task). A rendered GM output 354A that may share various characteristics with rendered GM output 254A in FIG. 2 is generated and rendered on display 370, e.g., by rendering engine 112, based on a raw GM response (not depicted, e.g., 252A in FIG. 2) that was generated by GM response generation engine 128. Also rendered on display 370 are a thumbs up and down that are operable by the user to provide positive or negative feedback, respectively, about rendered GM output 354A, as well as an optional graphical element 374 that the user can select to initiate selected aspects of the present disclosure. In particular, the user may operate element 374 in order to initiate the process depicted in FIG. 2.

As noted previously, in some implementations, rendered GM output 354A may be provided within an editable text field or other similar interface. This may allow the user to edit rendered GM output 354A (and other rendered GM outputs described herein) directly, instead of requiring the user to copy and paste rendered GM output 354A into a text editor, word processor, or other application that allows the user to edit content. In some such implementations, user edits to rendered GM outputs may be annotated, e.g., using different font, color, etc., so that the user is able to keep track of which portions of the rendered GM output are original and which have been edited by the user. In some implementations, edited versions of rendered GM outputs may be preserved as part of saved threads, e.g., so that they can be used to generate downstream input prompts. In some implementations, an edited portion of a rendered GM response may then be selected by a user as a subportion and processed using an GM to generate a modified GM response. For instance, a user could manually edit a rendered GM output to change a detail (e.g., a variable name, constant value, condition, etc.), and then select the subportion of the rendered GM output that includes the changed detail and request additional modification(s) (e.g., simplify it, fix syntax errors, ensure consistency across entire source code, etc.). The edited subportion of the rendered GM response could then be assembled into a subsequent input prompt and processed as described herein.

Figure 3B:
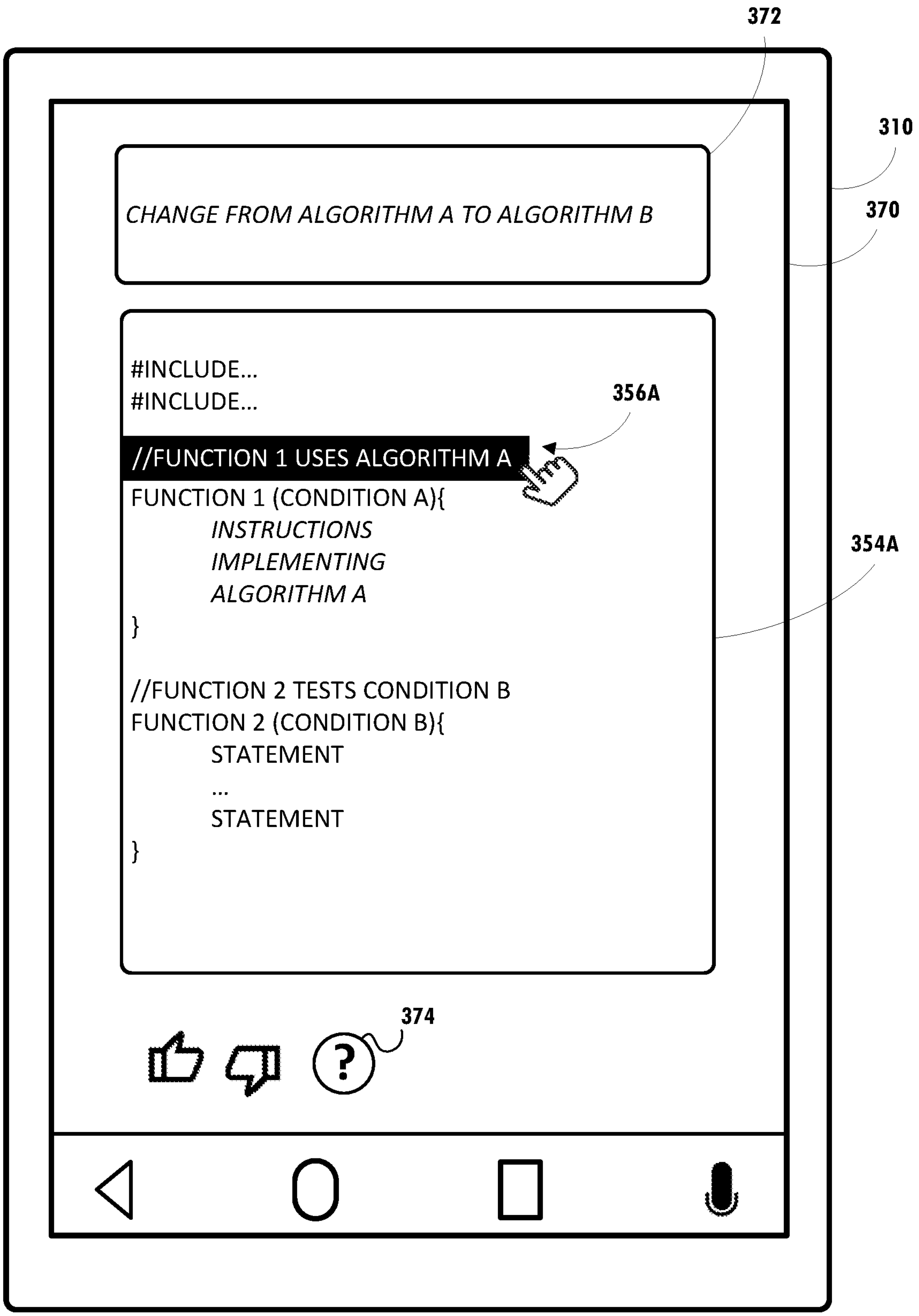
Figure 3C:
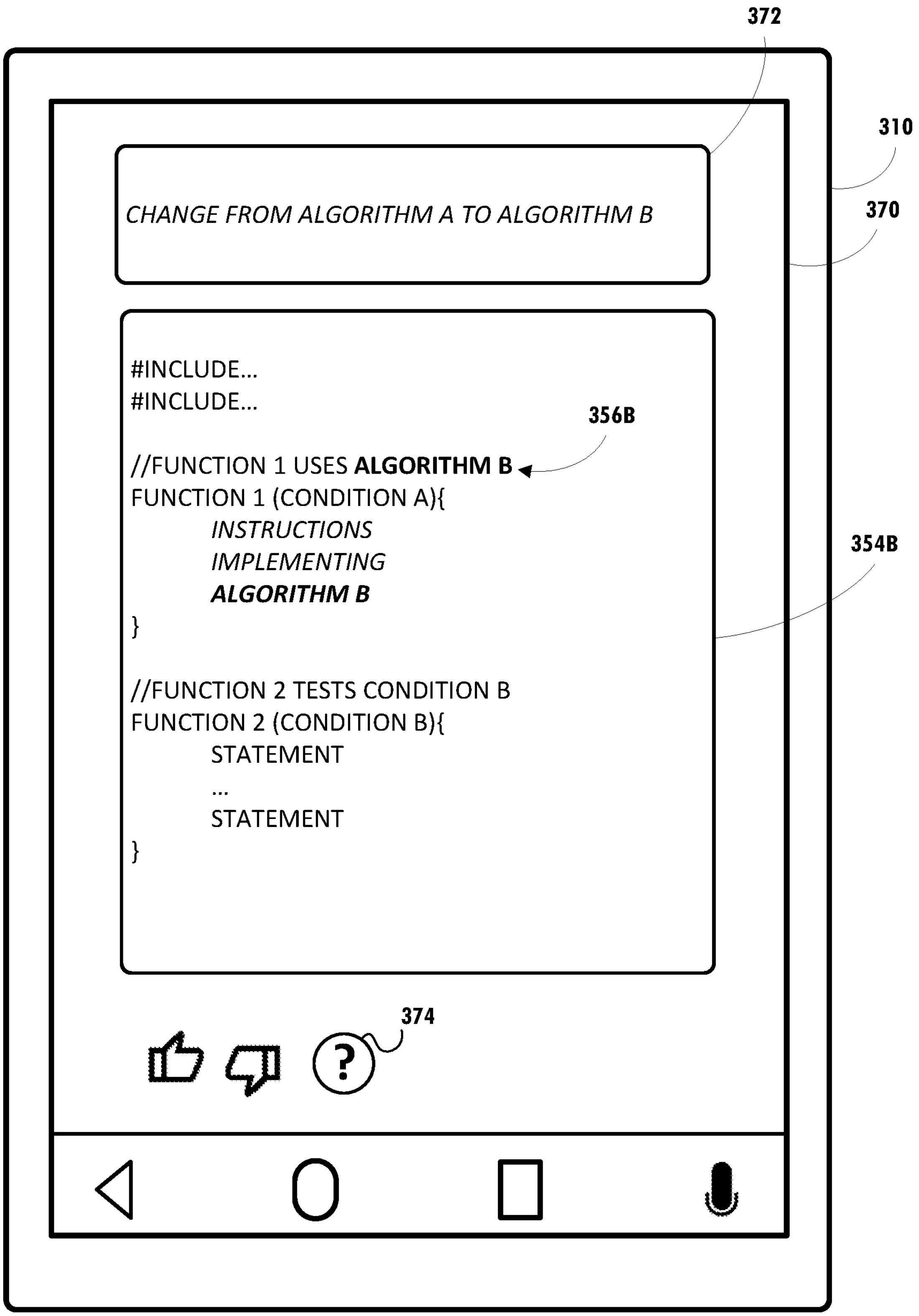

In FIG. 3B, the user has selected a subportion 356A—which may correspond to selected subportion 256A in FIG. 2—of rendered GM output 354A and provided, in query input field 372, the follow up request, "change from algorithm A to algorithm B." The selected subportion is a source code comment that indicates "Function 1 uses algorithm A." Consequently, in FIG. 3C, a subsequent rendered GM output 354B that includes a modified subportion 356B (which may correspond to modified subportion 256B in FIG. 2) has been used to replace the selected subportion 356A. As requested, the modified subportion 356B includes a source code comment that now indicates that "Function 1 uses algorithm B." However, as shown by the bolding, function 1 itself has also been modified, e.g., by way of consistency engine 132 ensuring that the GM input prompt that included the follow up request ("change from algorithm A to algorithm B") also includes the source code snippet ("function 1") to which the selected source code comment referred. As a consequence. the instructions of function 1 that previously implemented algorithm A now implement algorithm B.

In the example of FIGS. 3A-C, the user need not necessarily have selected the source code comment. Instead, the user could have issued the same command to change algorithm A to algorithm B, and the entire rendered GM output 354A could have been reprocessed by GM response generation engine 128 to obtain the same subsequent rendered GM output 354B depicted in FIG. 3C. However, only processing the selected subportion 356A, rather than the entire rendered GM output 354B, may consume fewer computing resources, as GMs typically include hundreds of millions, if not billions, of parameters. With myriad client computing devices interacting with NL based response system 120 during any time interval, conserving resources in this way may dramatically reduce latency, as well as conserve power.

Figure 3D:
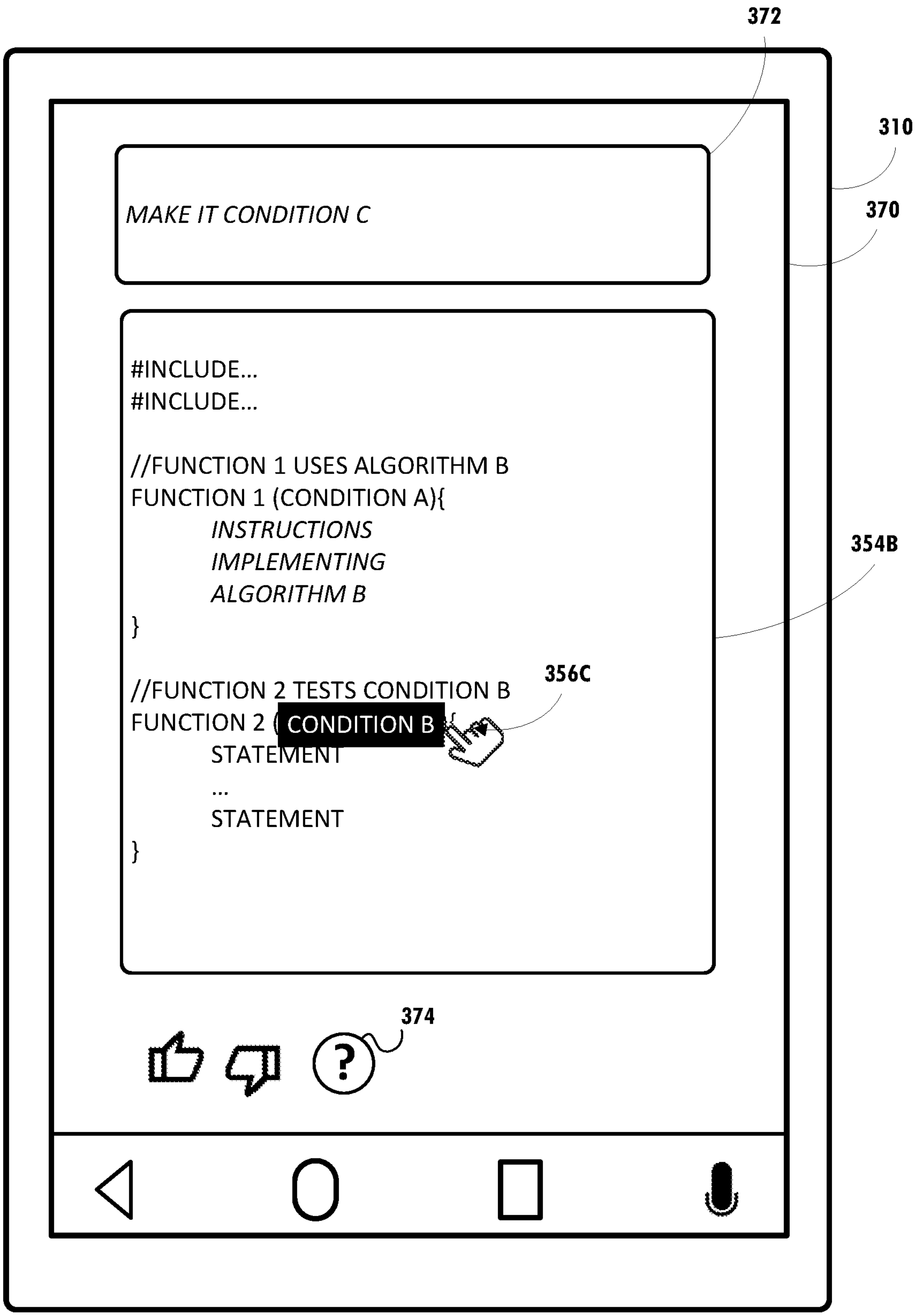
Figure 3E:
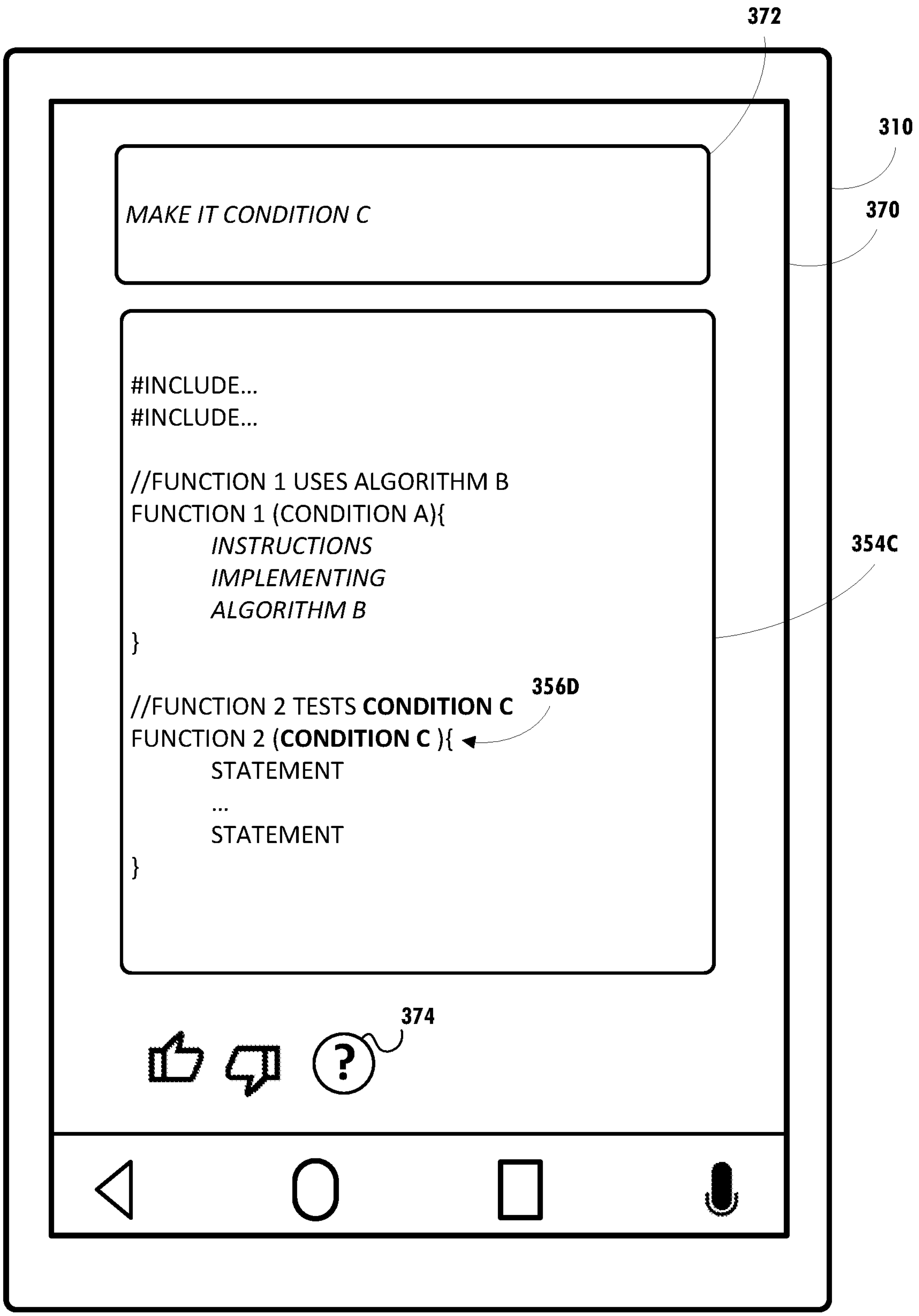

FIGS. 3D and 3E continue the example started in FIGS. 3A-C. In FIG. 3D, the user has selected a new subportion 356C that includes a "condition B" used in a function called "function 2." The user has issued a request in the input field, "make it condition C." Once again in FIG. 3E, subsequent rendered GM output 354C includes a modified subportion 356D. Modified subportion 356D has been modified in accordance with the user's request to now recite "condition C," instead of "condition B." As before, consistency engine 132 ensured that the corresponding source code comment ("function 2 uses condition B") is processed by GM response generation engine 128 to predict a corresponding change to the source code comment, so that it now reads, "function 2 tests condition C."

Figure 4A:
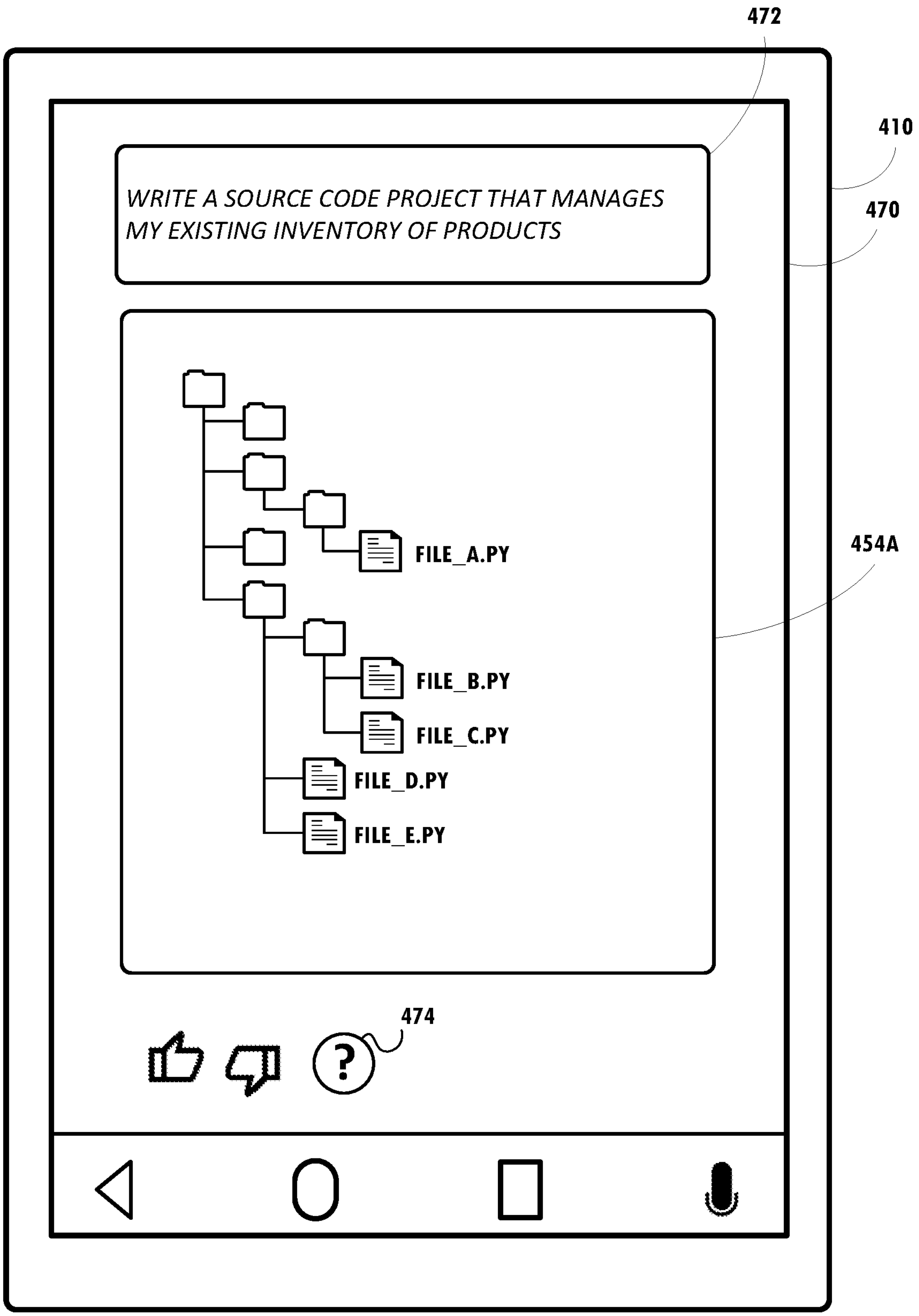
FIG. 4A, FIG. 4B, and FIG. 4C schematically depict more examples of a GUI being used in accordance with various implementations described herein.
Figure 4B:
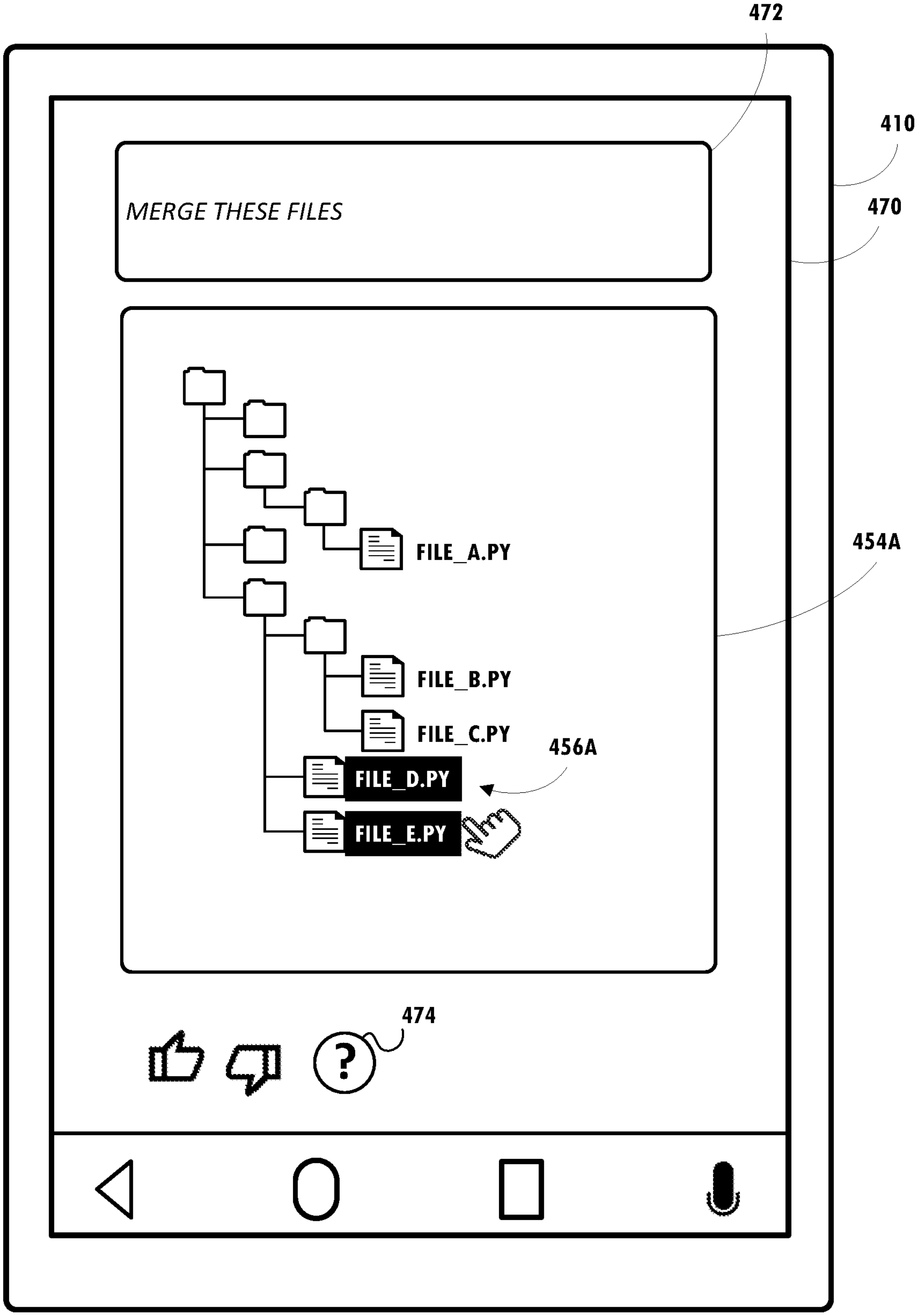
Figure 4C:
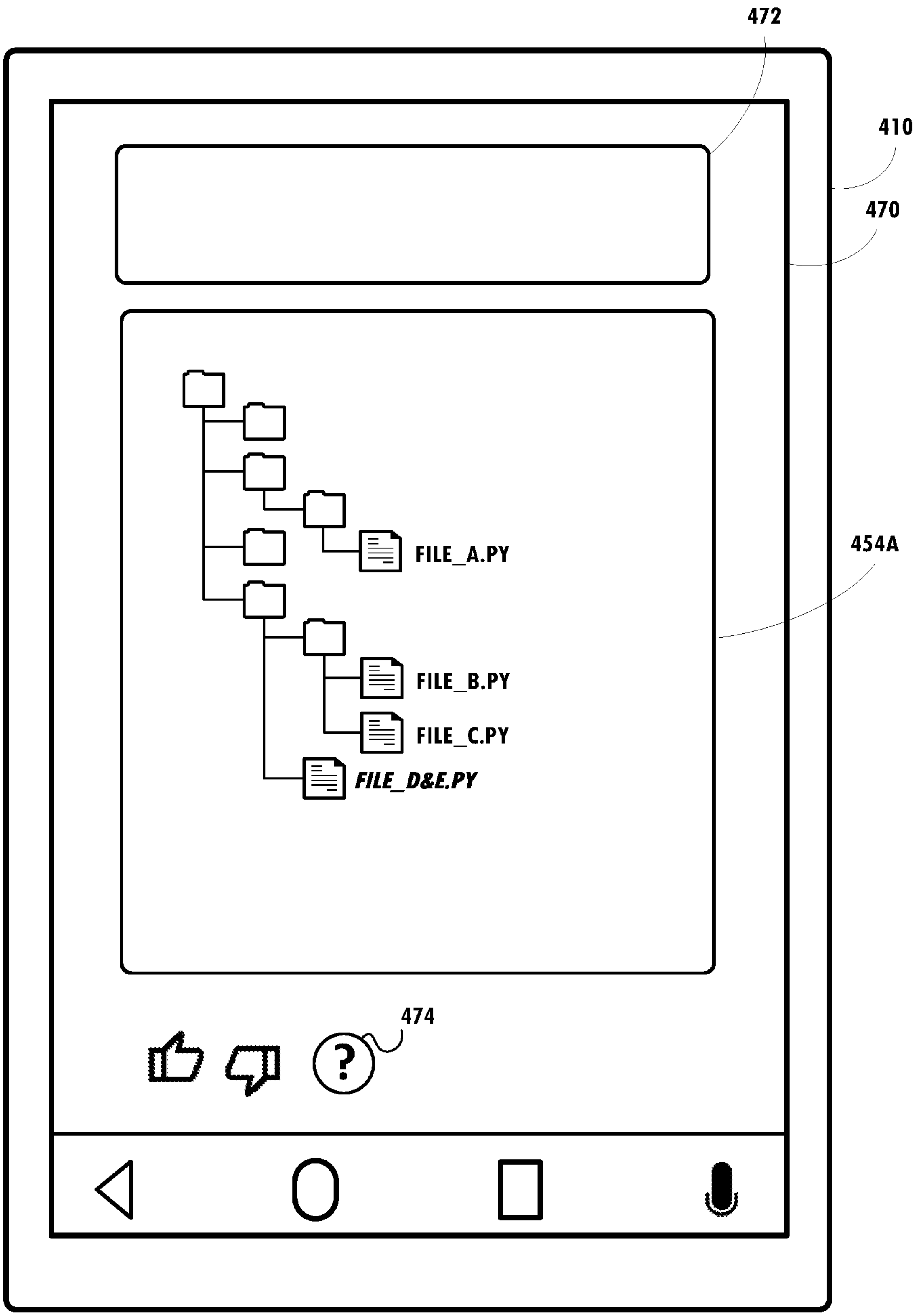

FIGS. 4A-C depict another example of an example client device 410 in the form of a tablet computer that is being used to engage with NL based response system 120. Client device 410 once again includes a display 470 on which a query input field 472 is rendered. A user (not depicted) has entered, into query input field 472 (by typing or having a spoken utterance speech recognized), the request, "write a source code project that manages my existing inventory of products." As a result, the rendered output 454A includes graphical elements in the form of folders and file icons that represent a source code hierarchy for a source code project created based on the user's request. For illustrative purposes, the source code hierarchy includes files A-E arranged as shown. However, this is not meant to be limiting. Source code hierarchies can take other forms as well, and can be arranged in hierarchies differently than what is depicted in FIG. 4A.

In FIG. 4B, the user has selected a subportion of the hierarchy that includes files D and E. In the input field 472, the user has issued the request, "merge these files." In various implementations, this may cause selection mapping engine 114 to determine starting and/or ending points of these selected source code files, e.g., relative to other points in the entirety of GM output 454A. Selection mapping engine 114 may provide these points to selection extraction engine 130. Selection extraction engine 130 may then retrieve the portion of the original GM response (e.g., tokens representing synthetic source code) that corresponds to these source code files based on these starting and/or ending points. The retrieved portion may then be processed by GM response generation engine 128 using one or more GMs 129 to generate a subsequent GM response. This subsequent GM response may be provided to rendering engine 112, which may render the output shown in FIG. 4C. In FIG. 4C, what were previously two separate files—file_D.py and file_E.py—are now merged into a single file, file_D&E.py.

Figure 5:
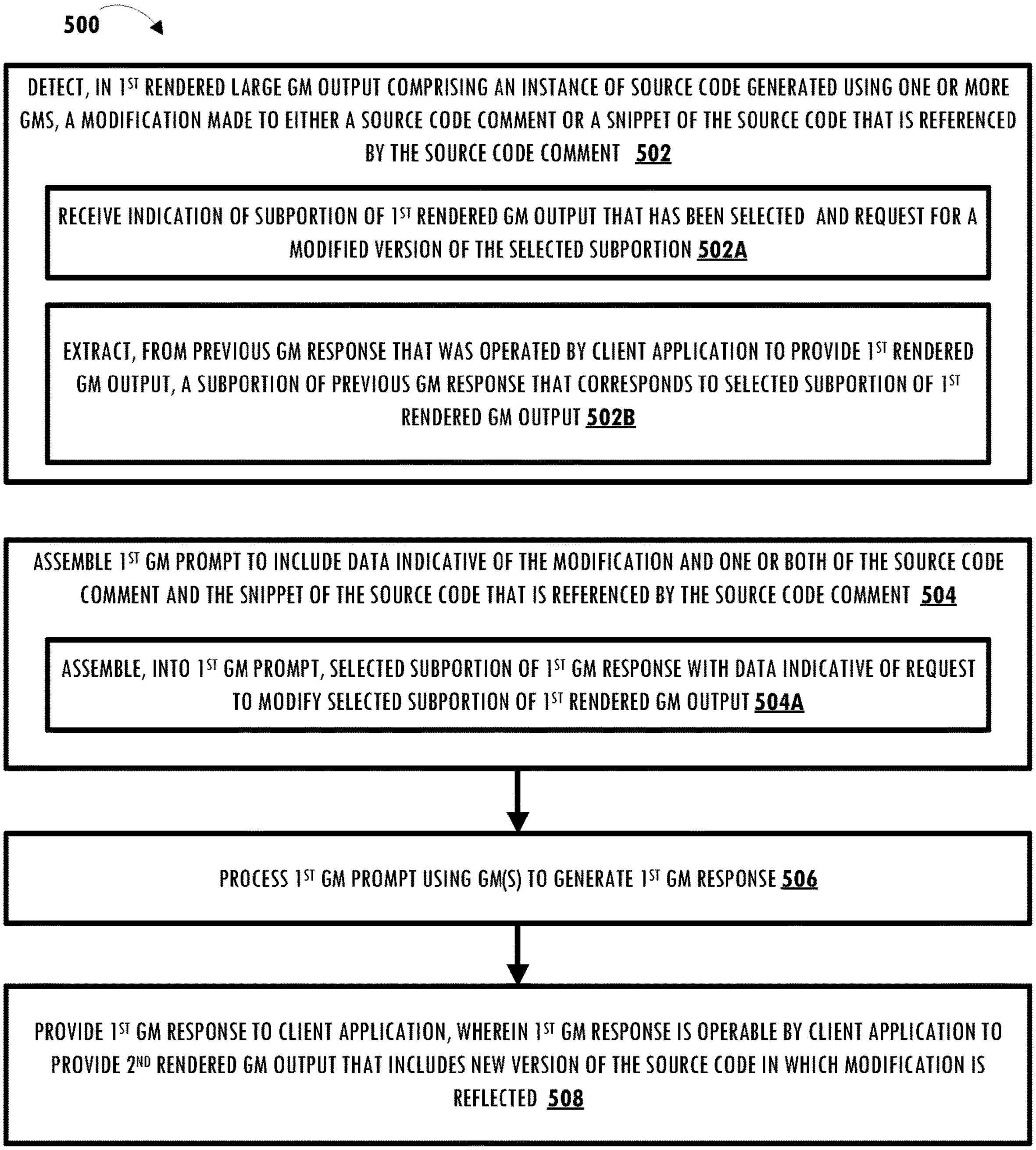
FIG. 5 depicts a flowchart illustrating an example method of practicing selected aspects of the present disclosure.

Turning now to FIG. 5, a flowchart is depicted that illustrates an example method 500 of implementing selected aspects of the present disclosure. For convenience, the operations of the method 500 are described with reference to a system that performs the operations. This system of the method 500 includes one or more processors, memory, and/or other component(s) of computing device(s). Moreover, while operations of the method 500 are shown in a particular order, this is not meant to be limiting. One or more operations may be reordered, omitted, and/or added.

At block 502, the system may detect, in first rendered GM output (e.g., 254A) comprising an instance of source code generated using one or more GMs, a modification made to one of either a source code comment or a snippet of the source code that is referenced by the source code comment. This may be accomplished in various ways. In some implementations, at block 502A, the system may receive an indication of a subportion (e.g., 256A) of the first rendered GM output that has been selected using one or more input devices, and a request for a modified version of the selected subportion of the first rendered GM output. At block 502B, the system, e.g., by selection extraction engine 130, may extract, from a previous GM response (e.g., 252A) that was operated by the client application to provide the first rendered GM output (e.g., 254A), a subportion (e.g., 258) of the previous GM response that corresponds to the selected subportion of the first rendered GM output. In other implementations in which the user does not select a subportion and instead simply requests modification of aspect(s) of the synthetic source code, blocks 502A-B may be omitted.

At block 504, the system, e.g., by way of GM input engine 126, may assemble a first GM prompt to include data indicative of the modification and one or both of the source code comment and the snippet of the source code that is referenced by the source code comment. Where applicable, at block 504A, the system, e.g., by way of GM input engine 126, may assemble, into the first GM prompt, a selected subportion (e.g., 258) of the earlier GM response with data indicative of the request to modify the selected subportion of the first rendered GM output.

At block 506, the system, e.g., by way of GM response generation engine 128, may process the first GM prompt using one or more of the GMs (e.g., 129) to generate a first GM response (e.g., 252B). At block 508, the system, e.g., by way of UX engine 136, may provide the first GM response to a client application. The first GM response may be operable by the client application to provide second rendered GM output (e.g., 254B). The second rendered GM output may include a new version of the source code in which the modification to the one of either the source code comment or the snippet is reflected in the other of the source code comment or the snippet.

Figure 6:
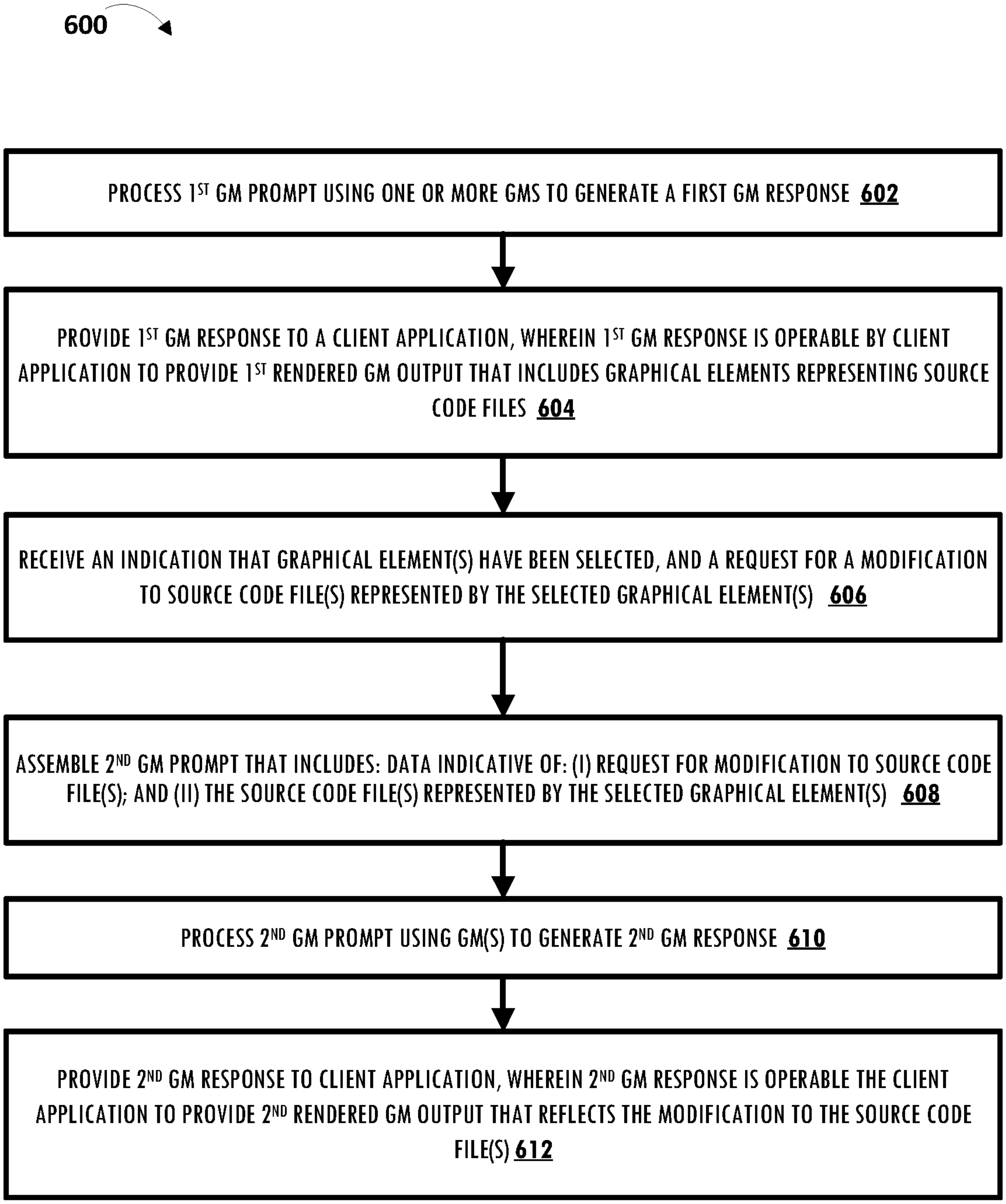
FIG. 6 depicts another flowchart illustrating another example method of practicing selected aspects of the present disclosure.

Turning now to FIG. 6, a flowchart is depicted that illustrates an example method 600 of implementing selected aspects of the present disclosure. For convenience, the operations of the method 600 are described with reference to a system that performs the operations. This system of the method 600 includes one or more processors, memory, and/or other component(s) of computing device(s). Moreover, while operations of the method 600 are shown in a particular order, this is not meant to be limiting. One or more operations may be reordered, omitted, and/or added.

At block 602, the system, e.g., by way of GM input engine 126 and/or GM response generation engine 128, may process a first GM prompt using one or more GMs to generate a first GM response. For example, in FIG. 4A, the user request to "write a source code project that manages my existing inventory of products" was assembled into a first GM prompt and processed to generate the hierarchy of graphical elements representing source code files that was depicted in FIG. 4B.

At block 604, the system may provide the first GM response to a client application. The first GM response may be operable by the client application to provide first rendered GM output. As shown in FIG. 4B, the first rendered GM output may include a plurality of graphical elements representing a plurality of source code files that may or may not be arranged in a hierarchy.

At block 606, the system may receive an indication that one or more graphical elements of the plurality of graphical elements have been selected using one or more input devices. The system may also receive, at block 606, a request for a modification to one or more of the source code files represented by the one or more selected graphical elements.

At block 608, the system may assemble a second GM prompt that includes: data indicative of the request for the modification to one or more of the source code files represented by the one or more selected graphical elements, and data indicative of the one or more source code files represented by the one or more selected graphical elements;

At block 610, the system, e.g., by way of GM response generation engine 128, may process the second GM prompt using one or more of the GMs to generate a second GM response. At block 612, the system, e.g., by way of UX engine 136, may provide the second GM response to the client application. The second GM response may be operable by the client application to provide second rendered GM output that reflects the modification to one or more of the source code files. An example of this is depicted in FIG. 4C.

Figure 7:
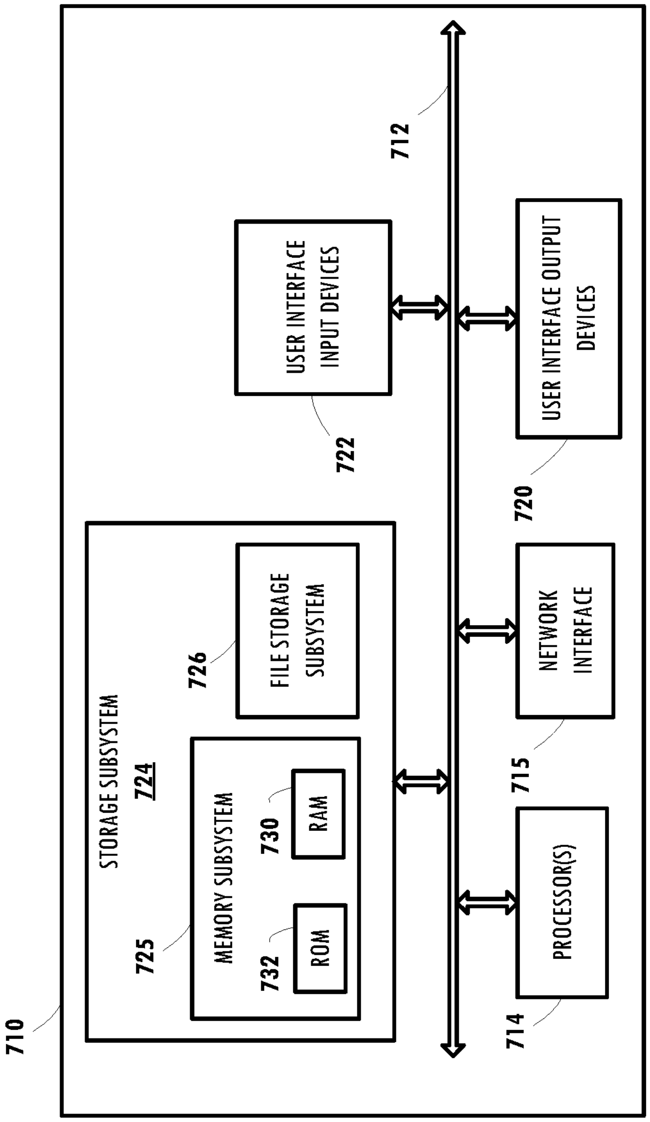
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1 or 2.

These software modules are executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714. Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be altered before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that the user's particular geographic location cannot be determined. Thus, the user may have control over how information is collected about the user and/or used.

What is claimed is:

1. A method implemented using one or more processors, comprising:

detecting, in first rendered generative model (GM) output comprising an instance of source code generated using one or more GMs, a modification made to one of either;

a source code comment comprising natural language that describes a snippet of the source code, or the snippet of the source code that is described referenced by the source code comment and that is composed using a programming language;

assembling a first GM prompt to include data indicative of the modification and one or both of the source code comment and the snippet of the source code that is described by the source code comment;

processing the first GM prompt using one or more of the GMs to generate a first GM response; and providing the first GM response to a client application, wherein the first GM response is operable by the client application to provide second rendered GM output, and wherein the second rendered GM output comprises a new version of the source code in which:

when the modification was to the source code comment, the modification is also reflected automatically in the snippet of the source code, and when the modification was to the snippet of the source code, the modification is also reflected automatically in the source code comment.

2. The method of claim 1, wherein the modification is made to the source code comment, and the snippet of the source code that is described by the source code comment is altered syntactically or functionally to reflect the modification made to the source code comment.

3. The method of claim 2, wherein at least one instance of the snippet of the source code is contained in the first rendered GM output.

4. The method of claim 2, wherein at least one instance of the snippet of the source code is contained outside of the first rendered GM output.

5. The method of claim 4, wherein the at least one instance of the snippet that is contained outside of the first rendered GM output is contained in another instance of source code that was generated using one or more of the GMs.

6. The method of claim 1, wherein the instance of source code comprises one source code file of a plurality of source code files generated using one or more of the GMs.

7. The method of claim 1, wherein the modification is made to the snippet of source code described by the source code comment, and the source code comment is altered semantically to reflect the modification made to the snippet of the source code.

8. The method of claim 1, further comprising:

receiving an indication of a subportion of the first rendered GM output that has been selected using one or more input devices, and a request for a modified version of the selected subportion of the first rendered GM output;

extracting, from a previous GM response that was operated by the client application to provide the first rendered GM output, a subportion of the previous GM response that corresponds to the selected subportion of the first rendered GM output; and assembling, into the first GM prompt, the selected subportion of the previous GM response with data indicative of the request for the modified version of the selected subportion of the first rendered GM output.

9. The method of claim 8, wherein the request comprises a natural language request that is spoken and transcribed or typed.

10. The method of claim 8, wherein the request comprises a command received via a rendered selectable element of a graphical user interface.

11. The method of claim 10, wherein the rendered selectable element comprises an enumerated list of candidate modifications.

12. The method of claim 11, wherein the enumerated list of candidate modifications is a context specific list of candidate modifications that are selected based on the selected subportion of the first rendered GM output.

13. The method of claim 1, further comprising:

processing a second GM prompt using one or more of the GMs to generate a third GM response; and providing the third GM response to the client application, wherein the third GM response is operable by the client application to provide third rendered GM output, and wherein the third rendered GM output comprises a plurality of graphical elements representing a plurality of source code files generated using one or more of the GMs.

14. The method of claim 13, wherein the plurality of graphical elements are arranged in a hierarchy that is based on dependencies between the plurality of source code files.

15. The method of claim 13, further comprising:

receiving an indication that one or more graphical elements of the plurality of graphical elements have been selected using one or more input devices, and a request for a modification to one or more of the plurality of source code files represented by the one or more selected graphical elements;

assembling third GM prompt that includes:

data indicative of the request for the modification to one or more of the plurality of source code files represented by the one or more selected graphical elements, and data indicative of the one or more of the plurality of source code files represented by the one or more selected graphical elements;

processing the third GM prompt using one or more of the GMs to generate a fourth GM response; and providing the fourth GM response to the client application, wherein the fourth GM response is operable by the client application to provide fourth rendered GM output that reflects the modification to one or more of the plurality of source code files.

16. The method of claim 15, wherein the fourth rendered GM output comprises an updated plurality of graphical elements arranged in an updated hierarchy that reflects the modification to one or more of the plurality of the source code files.

17. The method of claim 15, wherein the request for the modification to one or more of the source code files comprises a request to merge two or more of the source code files.

18. The method of claim 15, wherein the request for the modification to one or more of the source code files comprises a request to alter a dependency between two or more of the source code files.

19. A system comprising one or more processors and memory storing instructions that, in response to execution by the one or more processors, cause the one or more processors to:

detect, in first rendered large language model (GM) output comprising an instance of source code generated using one or more GMs, a modification made to one of either;

a source code comment comprising natural language that describes a snippet of the source code, or the snippet of the source code that is described by the source code comment and that is composed using a programming language;

assemble a first GM prompt to include data indicative of the modification and one or both of the source code comment and the snippet of the source code that is described by the source code comment;

process the first GM prompt using one or more of the GMs to generate a first GM response; and provide the first GM response to a client application, wherein the first GM response is operable by the client application to provide second rendered GM output, and wherein the second rendered GM output comprises a new version of the source code in which:

when the modification was to the source code comment, the modification is also reflected automatically in the snippet of the source code, and when the modification was to the snippet of the source code, the modification is also reflected automatically in the source code comment.

20. A method implemented using one or more processors, comprising:

processing a first generative model (GM) prompt using one or more GMs to generate a first GM response;

providing the first GM response to a client application, wherein the first GM response is operable by the client application to provide first rendered GM output, and wherein the first rendered GM output comprises a plurality of graphical elements representing a plurality of source code files;

receiving an indication that one or more graphical elements of the plurality of graphical elements have been selected using one or more input devices, and a request for a modification to one or more of the source code files represented by the one or more selected graphical elements;

assembling second GM prompt that includes:

data indicative of the request for the modification to one or more of the source code files represented by the one or more selected graphical elements, and data indicative of the one or more source code files represented by the one or more selected graphical elements;

processing the second GM prompt using one or more of the GMs to generate a second GM response; and providing the second GM response to the client application, wherein the second GM response is operable by the client application to provide second rendered GM output that reflects the modification to one or more of the source code files.

* * * * *